(No Model.)
A. SCHMITZ.
SHEET METAL CAN.
No. 342,044. Patented May 18, 1886.
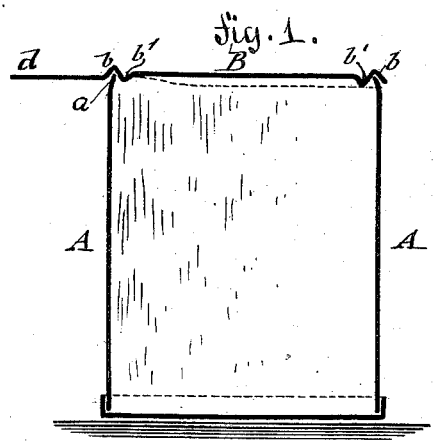
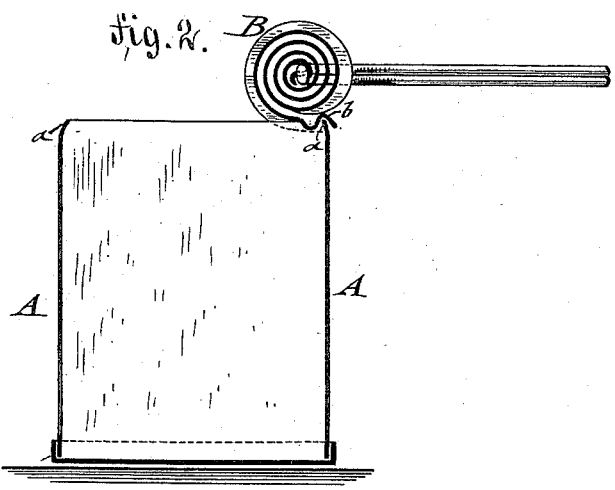
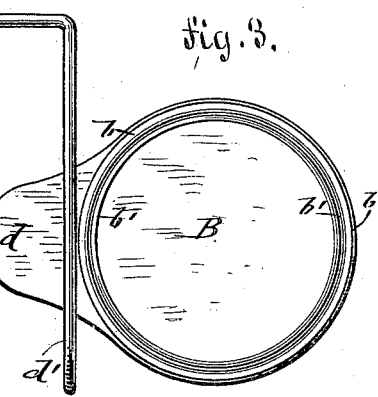
WITNESSES:
Joh. W. Rosenbaum.
Martin Petry.
INVENTOR
Anton Schmitz
BY Goepel & Raegener
ATTORNEYS.

UNITED STATES PATENT OFFICE.

ANTON SCHMITZ, OF NEW YORK, N. Y.

SHEET-METAL CAN.

SPECIFICATION forming part of Letters Patent No. 342,044, dated May 18, 1886.

Application filed March 31, 1886. Serial No. 197,243. (No model.)

*To all whom it may concern:*

Be it known that I, ANTON SCHMITZ, of the city, county, and State of New York, have invented certain new and useful Improvements in Sheet-Metal Cans, of which the following is a specification.

This invention relates to improvements in sheet-metal cans for preserving meats, fruits, vegetables, and also for paints, condensed milk, and other substances, said cans having the advantage of being easily opened and capable of being entirely emptied of their contents; and the invention consists of a sheet-metal can the body of which is provided at its upper edge with an inwardly-bent rim to which the lid is soldered, said lid being provided with an annular V-shaped rim, an annular depression or groove inside of said rim, and a laterally-extending lip at one point of the lid. The lip is engaged by a slotted lever having a handle at right angles to the slotted part, so as to open the can by rolling the lip around the lever.

In the accompanying drawings, Figures 1 and 2 represent vertical central sections of my improved can, showing the same respectively in closed and open position. Fig. 3 is a plan of the same with the lever-handle in position on the lip for opening the lid; and Fig. 4 is a detail perspective view of my improved lever-handle.

Similar letters of reference indicate corresponding parts.

Referring to the drawings, A represents the body of a sheet-metal can, of any suitable size or shape, such as are used for preserving fruits, meats, vegetables, paints, and other articles. The body A has an inwardly-bent upper edge, $a$, to which is soldered the annular V-shaped rim $b$ of the top or lid B. The lid B is provided next adjoining the rim $b$ with a depression or groove, $b'$, which, in connection with the rim $b$, facilitates the soldering of the lid to the body A, which is accomplished by holding the body in inverted state, so that the solder is run in around and into the space between the inwardly-bent edge $a$ of the body and the outer edge of the V-shaped rim of the lid B. The lid B is provided with a laterally-extending lip, $d$, of suitable size, which projects beyond the body A in the same plane with the lid B. The lip $d$ is engaged by a lever, D, that is bent of stout wire which is doubled up in such a manner that a narrow slit is formed in one part, and a handle, $d^2$, is formed of the abutting ends, which are bent at right angles to the slotted part and united by soldering or otherwise. The slotted portion of the handle D is placed transversely over the lip $d$ of the lid B when the can is to be opened, as shown in Fig. 3, upon which the lever is turned by its handle, which acts as a lever, so as to roll up the top around the slotted portion, as shown in Fig. 2.

By winding up the lid on the slotted part of the lever the can is opened, as the force of the lever overcomes the resistance of the solder and produces the detaching of the rim from the body of the can. A number of such handles are furnished with each box of cans, so that one can be given away with each can to be at hand and ready for use whenever required.

For opening the can no cutting-tool or can-opener is required, while the rolling up of the lid has the advantage that no part of the lid remains on the body, so that the contents of the can can be entirely removed without any part remaining thereon, which is the essential advantage in cans for condensed milk, paints, or other thickened and badly-flowing substances, as no part thereof is left in the cans and wasted.

Having thus described my invention, I claim as new and desire to secure by Letters Patent—

1. A sheet-metal can having a body with an inwardly-bent upper edge, and a lid or top having a V-shaped rim overlapping the upper edge of the body, an annular groove or depression adjoining said rim, and a laterally-extending lip at one side of the lid, substantially as set forth.

2. The combination of a can-body having an inwardly-bent upper edge, a top having a V-shaped rim, an annular groove or depression next adjoining the rim, and a laterally-extending lip and a lever-handle having a slotted portion for engaging the lip, and a handle at right angles to the slotted portion, substantially as set forth.

In testimony that I claim the foregoing as my invention I have signed my name in presence of two subscribing witnesses.

ANTON SCHMITZ.

Witnesses:
PAUL GOEPEL,
MARTIN PETRY.